Figure 1:
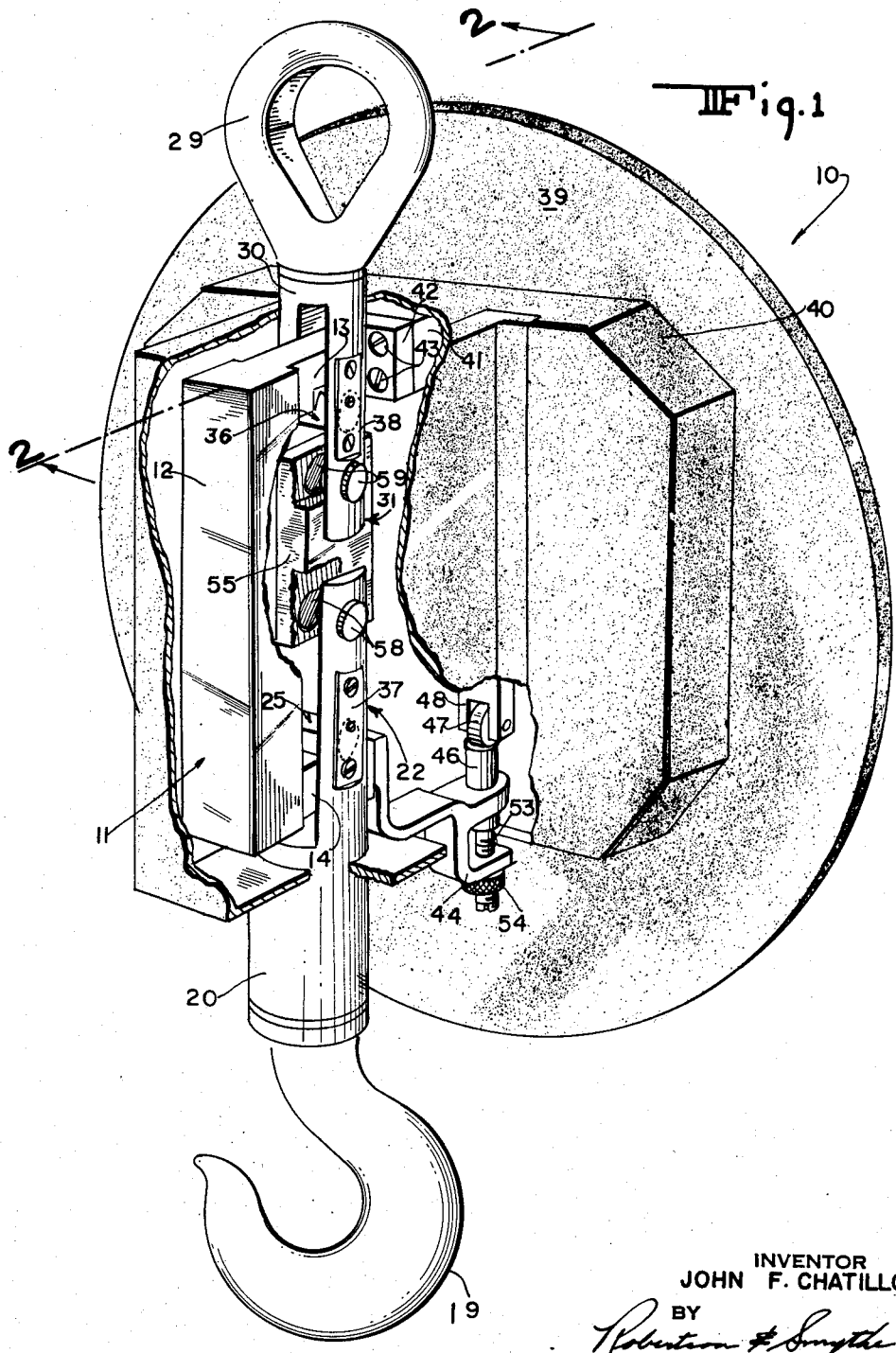

March 19, 1963

J. F. CHATILLON
SCALE 3,081,835

Filed Oct. 31, 1960

3 Sheets-Sheet 1

INVENTOR
JOHN F. CHATILLON
BY
Robertson & Smythe
ATTORNEY

March 19, 1963 J. F. CHATILLON 3,081,835
SCALE

Filed Oct. 31, 1960 3 Sheets-Sheet 2

INVENTOR
JOHN F. CHATILLON
BY
ATTORNEY

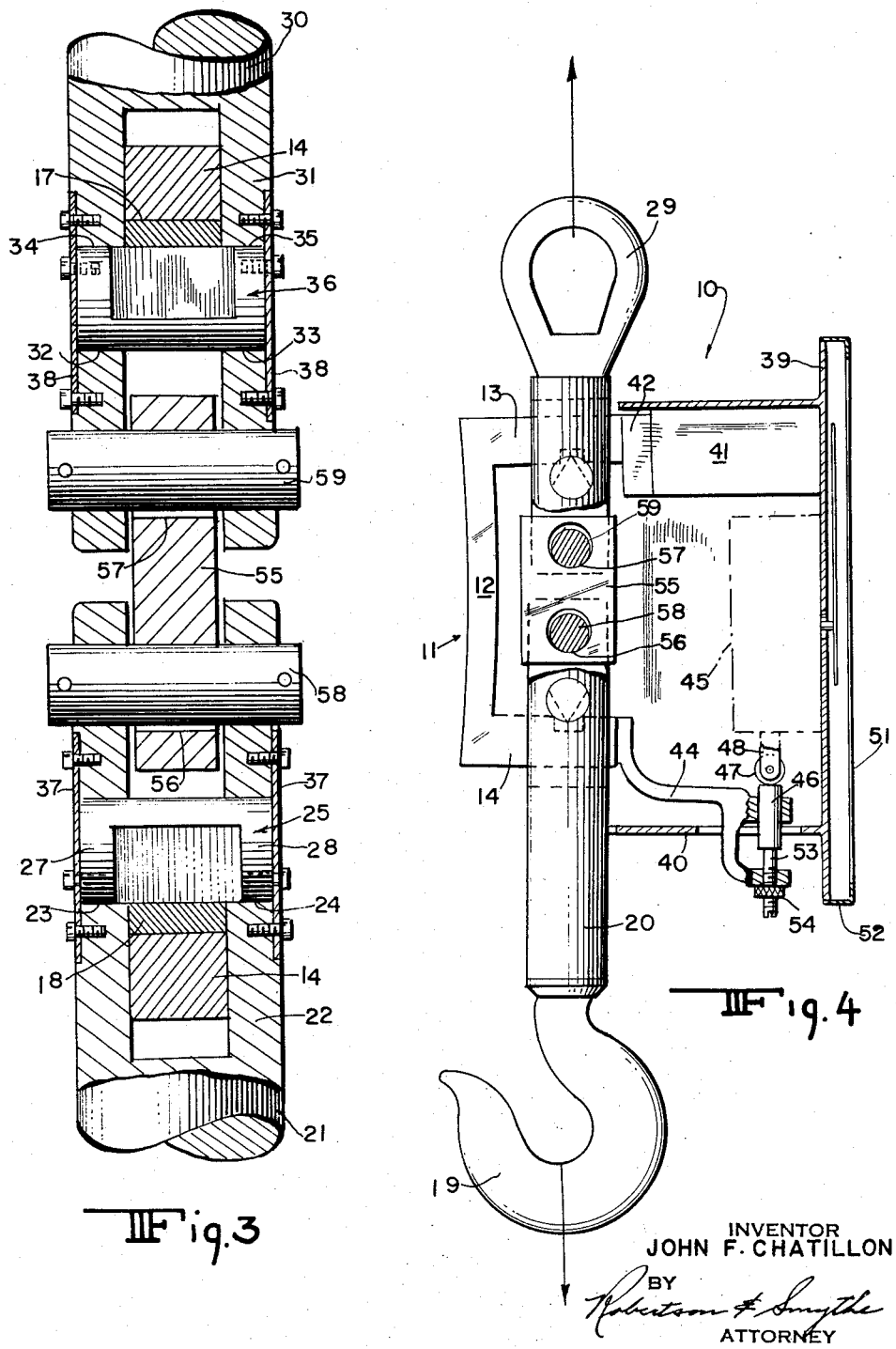

United States Patent Office 3,081,835
Patented Mar. 19, 1963

3,081,835
SCALE
John F. Chatillon, New Canaan, Conn., assignor to John Chatillon & Sons, New York, N.Y., a corporation of New York
Filed Oct. 31, 1960, Ser. No. 66,047
5 Claims. (Cl. 177—229)

This invention relates to a weighting scale in which the movements of the portions of a C-shaped spring adjacent to its free ends are used to indicate the weight of the load applied to the scale. In industry the price of many products, notwithstanding their large size and weight, is still determined by weight. To measure the weight of these products requires a scale that is both accurate and of high capacity. Weighing scales employing a C-shaped spring as the sensing unit are often used since such a spring is simple to form, suitable for very high load levels, and inherently reliable.

In weighing certain products such as steel beams, plates, etc., experience has shown that it is most convenient to weigh these objects while they are being moved within the mill. Since these objects are commonly moved by cranes, scales have been provided which are adapted to be inserted in the lifting apparatus between the hoisting machinery and the load. In such application large loads are customarily involved and therefore the C-spring must be provided with a heavy and consequently quite rigid body portion from the ends of which extend arm members adapted to engage with the load and the support means. Attempts to measure the deflection of the C-spring body portion in order to determine the load have encountered the problem of accurately measuring the small deflections which occur even at maximum load.

Weighing scales employing C-springs are subject to another difficulty, namely that of overloading the spring due to excessive or impact load conditions. If the C-spring is heavily overloaded it can be deflected beyond its elastic range with the result that it experiences a permanent set which can destroy its calibration. Furthermore, the high deflections accompanying overloads can damage the precision movement that serves to indicate the spring deflections. Lastly, overloading the C-spring can even result in its complete failure accompanied by the dropping of the load.

According to my invention, a weighing scale is provided in which the sensing element is a C-shaped spring having a body portion and arm members extending from it. Means are provided for connecting the load to one of the arm members and a support to the other arm member so that the forces applied to the arm members act in substantially opposite directions in a plane containing the C-spring. Means are also provided for indicating the relative movement of the arm members adjacent to their free end portions where the deflection of the body portion of the C-spring is magnified. The determination of the movement of the arm members then serves as a measurement of the weight of the load. With this arrangement the difficulty of measuring the deflection of the C-spring in the region of its body portion is eliminated. Furthermore, measuring deflection of the spring at the outer free ends of the spring takes advantage of the inherent magnification caused by the lengths of the arm members.

In another embodiment of the invention a safety link is disposed between the means for connecting the load to one of the spring arm members and the means for connecting the support to the other arm member. The link is adapted to engage the connecting means and to prevent further load from being applied to the spring whenever the spring has been deflected to a predetermined limiting point. From the limiting point on, all additional overloads are carried solely by the safety link, thereby protecting the C-spring.

With reference to the accompanying drawings I shall now describe the best mode contemplated by me for carrying out my invention.

Figure 2:
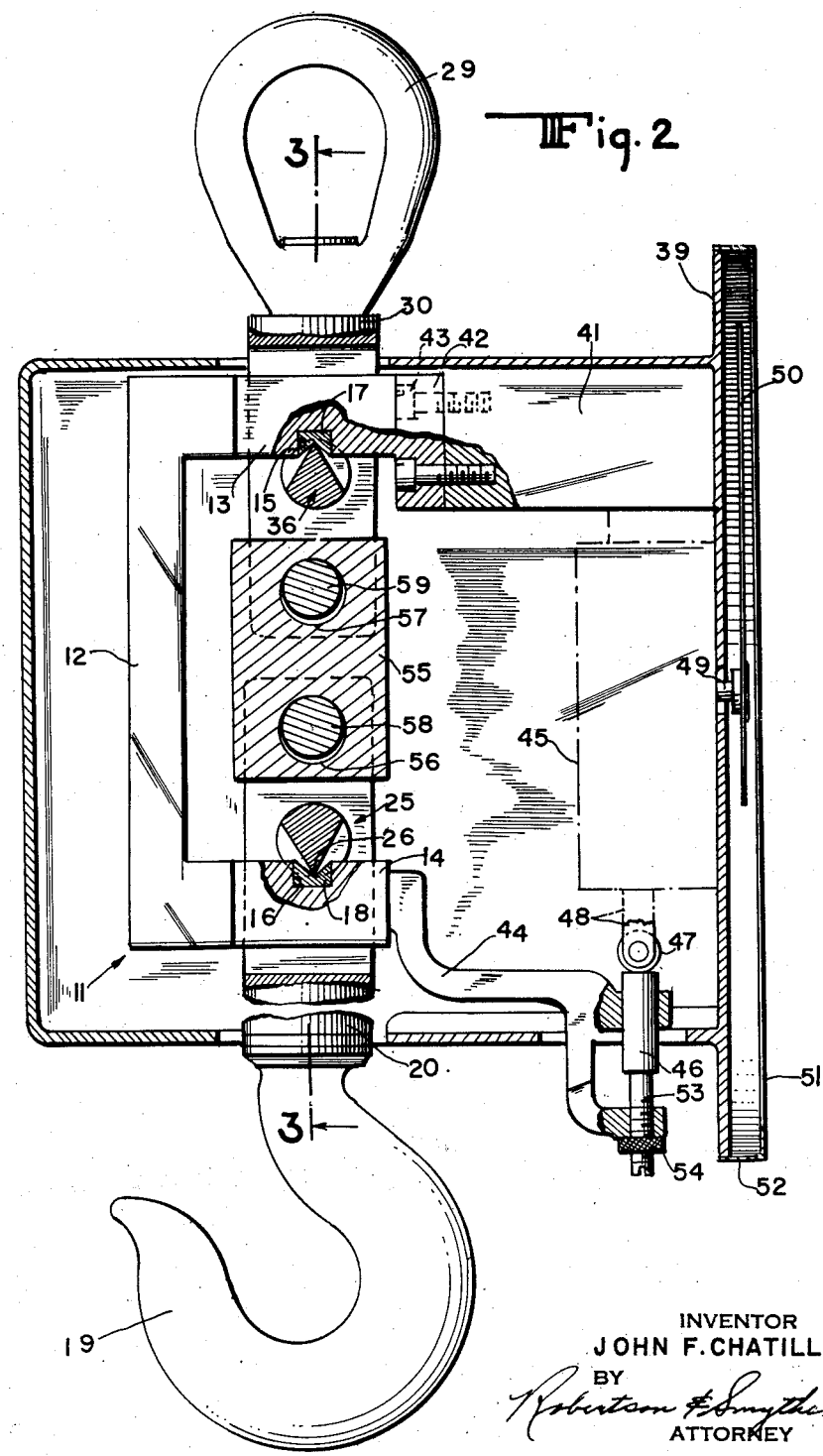

In the drawings:
FIG. 1 is a perspective view of the weighing scale;
FIG. 2 is a sectional view of the scale taken along the line 2—2 of FIG. 1;
FIG. 3 is an enlarged sectional view of the safety link taken along the line 3—3 of FIG. 2; and
FIG. 4 is a sectional view of the scale during an overload condition.

The sensing element of weighing scale 10 is C-shaped spring 11 (FIG. 1). C-spring 11 includes body portion 12 from the ends of which arms 13 and 14 extend at substantially right angles (FIG. 2). The inner surfaces of arms 13 and 14 adjacent to their free ends are provided with slots 15 and 16, respectively, which are adapted to receive bearings 17 and 18, respectively. The force of the load to be weighed is applied to arm 14 while the force of the support for the scale is applied to arm 13. The application of these forces causes a bending moment to be applied to body portion 12 of the C-spring. The section of body portion 12 is proportioned so that it will deflect substantially in the plane in which arms 13 and 14 are disposed. Arms 13 and 14 are provided with sections of sufficient size to make them substantially rigid with respect to the applied load and support forces. The result of this construction is that C-spring 11 is essentially a flexible beam to which is attached at its ends two rigid cantilever beams at substantially right angles. By concentrating the deflection of the C-spring primarily in the body portion, simpler and more linear measurements of the deflection are reflected at the free end portions of arms 13 and 14.

The objects to be weighed are attached to hook 19 which is supported by swivel 20. Coupled to swivel 20 is lower link 21 which includes yoke 22. Openings 23 and 24 in yoke 22 are adapted to receive pivot 25 which serves as a form of knife-edge suspension. Pivot 25 has a wedge-shaped cross-section which converges to a very narrow flat surface substantially tangential to the journals 27 and 28 of the pivot. Pivot 25 is supported by the sloping surfaces of bearing 18 which are substantially at right angles to one another. Since the included angle of the wedge-shaped surfaces of pivot 25 is appreciably less than 90° the edges of flat surface 26 of the pivot transmit the load to the surface of the bearing. In this way, a very low level of friction is encountered in transmitting the load from hook 19 to arm 14 of the C-spring.

The supporting load for scale 10 is transmitted through top eye 29 to top link 30 which is provided with yoke 31. As in the case of yoke 22, yoke 31 contains openings 32 and 33 which are adapted to receive journals 34 and 35 of pivot 36. Pivot 36 which is similar in construction to pivot 25 rests in bearing 17 which is retained in slot 15 of arm 13. By means of this arrangement it is evident that the force due to the load and the force of the support are transmitted to C-spring 11 along a line which is positioned substantially parallel to the axis of body portion 12. In this manner the moment arms of these forces are maintained substantially equal. With the application of load to hook 19 it is also evident that body portion 12 will deflect as arms 13 and 14 are moved away from one another. Due to the deflection of body portion 12 the arms experience arcuate motions. Because of these arcuate motions, a change in the relative positions of the pivots and bearings occurs but because of the knife-edge arrangement only a minimum of friction results. Consequently, it is insured that only forces and not moments are transmitted by the pivots to the bearings in their respective arms. To prevent pivots 25 and 26 from rotating in their respective links when load is applied, pairs of friction plates 37 and 38 are applied to lower link 21 and top link 30, respectively, which are connected to the pivots.

Front cover 39 of scale 10 is provided with housing 40 and extension 41 which is connected to flange 42 mounted upon the free end of arm 13 of the C-spring. Screws 43 secure flange 42 to extension 41. Arm 14 of the C-spring is provided with extension bracket 44 which serves to increase the effective length of the arm. Thus, as shown in FIG. 2, arms 13 and 14 of the spring scale are effectively extended by extension 41 and bracket 44. It may also be seen in FIG. 4 that front cover 39 and housing 40 are maintained in a rigid relationship with arm 13 as body portion 12 of the C-spring deflects and permits arm 14 to move with respect to arm 13. In this manner, arm 14 moves within the body of the scale and its movement is magnified by extension bracket 44.

In order to indicate the deflection of the C-spring so as to measure the applied load, it is necessary to measure the movement of extension bracket 44 with respect to the remainder of the scale including front cover 39. Consequently, the measuring means or movement 45 is mounted upon front cover 39. The movement may be of the type set forth in my copending application Serial No. 37,734, filed June 21, 1960. The motion of extension bracket 44 is transmitted through anvil 46 to roller 47 mounted in input link 48 of movement 45. The linear motion imparted to input link 48 is converted to a magnified rotational motion by movement 45 and the output of the movement is transmitted through shaft 49 to pointer 50. Pointer 50 indicates the weight on the dial mounted upon the front surface of front cover 39. Crystal 51 which is mounted by bezel 52 protects the pointer and dial assembly.

Prior to operating the scale it is necessary to set pointer 50 to the zero marking on the dial. To accomplish this, anvil 46 is raised or lowered as required by means of adjusting screw 53 to which is attached knob 54. Movement of anvil 46 by means of the adjusting screw is transmitted to movement 45 so as to position the pointer 50 at the zero marking. To prevent the introduction of random errors during operation, anvil 46 may be fitted in such a manner in bracket 44 so as to prevent its rotation.

To protect the C-spring from impact loading or other overload conditions safety link 55 is employed (FIG. 3). The safety link is provided at both ends with openings 56 and 57 to receive pins 58 and 59 mounted in lower link 21 and top link 30 with at least one of the openings having a clearance fit with the pin. Due to the clearance between the openings in safety link 55 and the pins, no force is transmitted through the link during normal operation of the scale. However, when the load being weighed is suddenly moved so as to cause impact or if the load is of an excessive value, C-spring 11 will deflect to such an extent that the pins come into engagement with the openings in safety link 55. This condition is shown in exaggerated form in FIG. 4. At this point it is evident that the excessive portion of the load is then carried by the safety link instead of being carried by the C-spring. The load point at which the safety link comes into operation is determined by a knowledge of the deflection characteristic of the C-spring and by the proper proportioning and location of the openings in the safety link. As an additional safeguard the safety link is fabricated from a ductile material that can withstand the shock of the rapid application of energy that it will experience in the presence of an impact load.

It should be apparent that variations may be made in the construction as needed without departing from the spirit of the invention except as defined in the appended claims.

I claim:

1. In a weighing scale, a spring having a substantially straight body portion and an arm extending at substantially right angles from each end of said body portion, means for connecting a load to one of the arms, and means for connecting a support to the other arm, the forces applied to the arms by the connecting means acting substantially in opposite directions and in a line which is substantially parallel to the axis of said body portion.

2. In a weighing scale according to claim 1, the construction in which said arms of the spring are of a size to make them relatively rigid whereby deflection of the spring occurs primarily in said body portion.

3. In a weighing scale according to claim 1, the construction in which said arms of the spring are substantially larger in cross section than said body portion whereby deflection of the spring occurs primarily in said body portion.

4. In a weighing scale according to claim 1, the construction in which said means for connecting a load and a support to the respective arms includes bearings on the inner surfaces of the arms engaged by knife-edged pivots associated with the respective connecting means, said pivots being located in said line parallel to the axis of the body portion.

5. In a weighing scale according to claim 4, the construction which includes means for coupling said connecting means to one another for limiting relative movement, said coupling means comprising a link whose axis is located in line with said pivots.

References Cited in the file of this patent

UNITED STATES PATENTS

| 1,001,666 | McGuire | Aug. 29, 1911 |
| 2,590,626 | Jones | Mar. 25, 1952 |
| 2,930,227 | Spademan et al. | Mar. 29, 1960 |

FOREIGN PATENTS

| 830,422 | Germany | Feb. 4, 1952 |